June 19, 1945.  L. ARSANDAUX  2,378,528
SUPPORTING ELEMENT FOR AIRCRAFT
Filed May 16, 1940  2 Sheets-Sheet 1

Inventor
Louis Arsandaux,
By Bailey & Parson
Attorneys

June 19, 1945.  L. ARSANDAUX  2,378,528
SUPPORTING ELEMENT FOR AIRCRAFT
Filed May 16, 1940  2 Sheets-Sheet 2

Inventor
Louis Arsandaux

By Bailey P. Larson
Attorneys

Patented June 19, 1945

2,378,528

UNITED STATES PATENT OFFICE 2,378,528

SUPPORTING ELEMENT FOR AIRCRAFT

Louis Arsandaux, Orleans, France; vested in the Alien Property Custodian

Application May 16, 1940, Serial No. 335,573
In France May 17, 1939

4 Claims. (Cl. 244—44)

The present invention relates to supporting elements, such as wings, for aircraft, and it is more particularly concerned with devices for deforming the vertical section of such elements, along the leading edge thereof.

The chief object of the present invention is to provide a device of this type which is better adapted to meet the requirements of practice than those used for the same purpose up to the present time, and in particular which permits of improving the lift of the aircraft element, especially the maximum lift thereof, by increasing the curvature of the median line of the aerofoil section, for instance with a view of obtaining a lower landing speed. The device may also act to increase the drag of the aircraft element, in order to brake it.

A particular object of the invention is provide means for deforming the external outline of the wing vertical section without acting on the frame of said wing.

Still another object of the invention is to provide means for deforming the external shape of the wing leading edge without producing sharp angles in the vertical section of the wing thus deformed.

Still another object is to permit a gradual deformation of the wing leading edge.

Still another object of my invention is to permit an elastic deformation of the wing leading edge.

For this purpose, according to an essential feature of the invention, I provide a deformable bag in the leading edge of the wing or other aircraft element, and this bag is more or less inflated through pneumatic means.

Of course, this device can be combined with other means for modifying the aerodynamic properties of the aircraft supporting element, such as a flap, a slot, or the like, or with means for removing ice from the wing surface.

Other features of the present invention will result from the following detailed description of some specific embodiments thereof.

Preferred embodiments of the present invention will be hereinafter described, with reference to the accompanying drawings, given merely by way of example, and in which.

Figure 1:
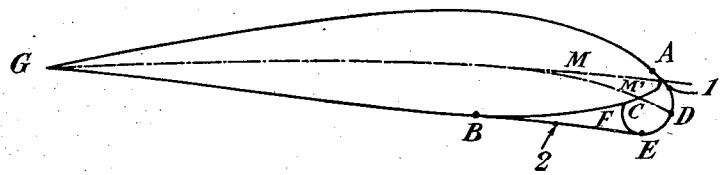
Fig. 1 is a diagrammatical view illustrating the principle of the invention.

The embodiment illustrated by Fig. 1 includes the following elements:

a. An air chamber or bag (of course this chamber can contain any gas other than air), the section of which is ADEFCA, made of a fluid-tight deformable material, such as a rubberized fabric, which is not extensible, or a sheet of rubber, which is extensible. This chamber or bag is secured at A to the upper side of the wing leading edge;

b. An envelope 2, extending from B to E, constantly stretched either by its own elasticity or by any suitable elastic return device. The function of this envelope 2 is to urge the air chamber toward the deflated position, without forming plaits or folds on the under side of the leading edge of the wing.

This device will operate in the following manner:

When no gas under pressure is present in chamber 1, the tension transmitted to point E by envelope 2 tends to keep the deformable device applied against the solid structure of the wing. This structure is so designed that the whole thus formed constitutes the normal contour of aerofoil GACBG, the median line of which is M. This normal shape is thus obtained even in case of leakage of the device.

When a gas under pressure (air) is introduced into chamber 1, it tends to take a shape such as ADEFCA, under the combined effect of the pressure in said bag or chamber 1 and of the reaction of envelope 2. This shape corresponds to another median line M', the curvature of which is greater than that of M.

Figure 2:
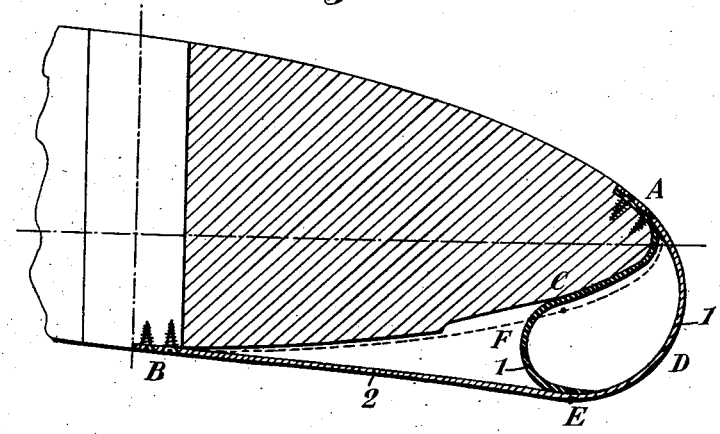
Fig. 2 is a vertical sectional view of a particular embodiment, showing the air chamber in the inflated position.
Figure 3:
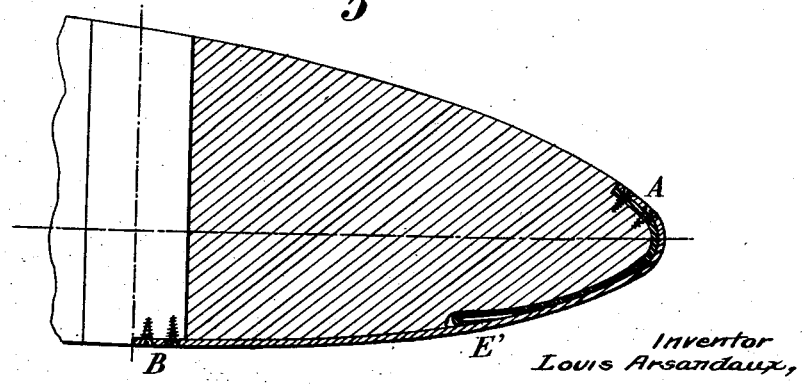
Fig. 3 is a similar view, showing the chamber in the deflated state.

Figs. 2 and 3 correspond to the case in which part 2 is supposed to consist of an elastic sheet, rigidly fixed at B to the solid structure of the wing and at E to the air chamber 1. In the embodiment of Fig. 2, the chamber is supposed to be inflated to the utilization pressure, while Fig. 3 shows the same device in the state of rest, corresponding to normal flight conditions.

Figure 4:
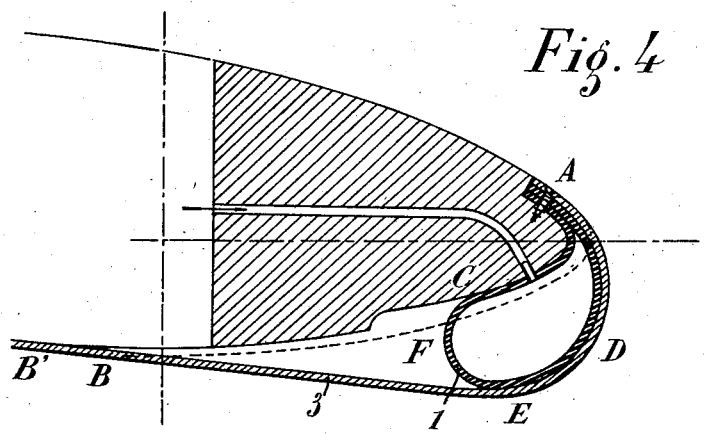
Fig. 4 is a view, similar to Fig. 2, showing another embodiment.
Figure 5:
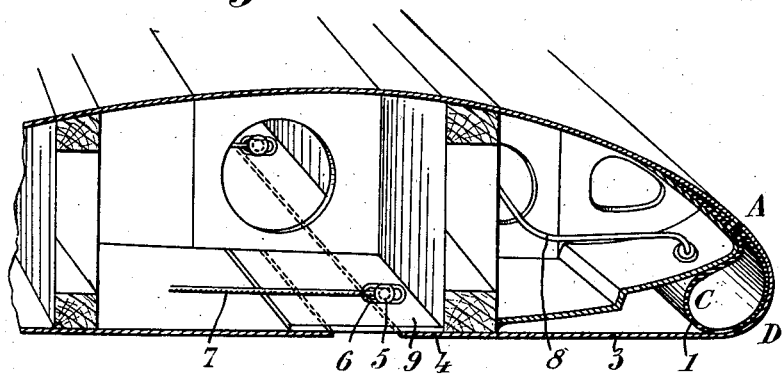
Fig. 5 is a perspective view showing the wing internal arrangement used in connection with the embodiment of Fig. 4.

Figs. 4 and 5 correspond to the case in which wall 2 is supposed to consist of an element 3 which is not extensible. This element 3 envelops the whole of air chamber 1, and it is rigidly fixed at A to the frame of the wing on the upper side of the leading edge and elastically urged at B' toward the rear of the under side of the wing.

In Fig. 5, I have shown a perspective of the inside of the wing, intended to show how the return means are adapted to act on element 3. A rigid flat bar, or blade 4 is fixed to the rear edge of element 3. It is provided with pins 5, which are urged rearwardly by elastic cables 7. These pins extend through guiding slots 6 provided in an element 9 of the wing frame, this element covering the slot which exists in the structure when the air chamber is to be inflated with air under pressure.

Figure 6:
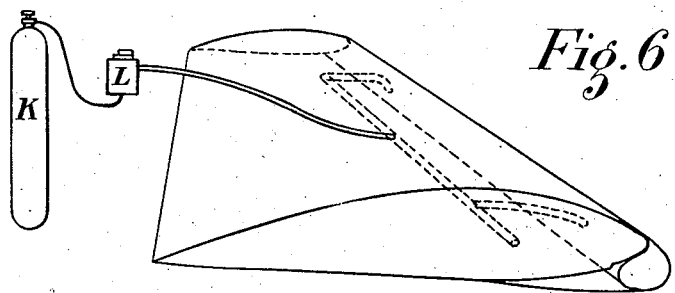
Fig. 6 is a diagrammatic perspective view, illustrating how compressed air can be fed to the air chamber.

The desired pressure is produced in air chamber 1 by feeding thereto a certain amount of air under pressure from any suitable source, for instance a bottle, as shown by Fig. 6. preferably with the interposition of a pressure relief device L, adapted to work between a maximum and a minimum, the limits depending upon the kinematic characteristics of the aircraft.

Of course, any other source of gas under pressure may be used according to the present invention.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In combination with an airfoil having a leading edge and a substantially plane undersurface symmetrically merging upwardly into and so as to form the underpart of said leading edge below the median plane of the airfoil; means operable to alter the aerodynamic effects of said airfoil, said means comprising a stretchable envelope secured to lie freely along and below said leading edge from a point not substantially higher up thereon than the median plane of the airfoil to a point substantially rearwardly displaced along said underpart with respect to the apex of the leading edge, and an expansible chamber located in the space between the airfoil and the free portion of said envelope and secured to the airfoil and to the envelope and normally confined by said envelope in a recess formed in the airfoil when not expanded whereby the envelope conforms to the contours of the leading edge and of said underpart, said expansible chamber being substantially forwardly spaced from the rearward terminus of the free part of the envelope whether said chamber be in unexpanded or expanded condition, and means for inflating said chamber to expand the same sufficiently to stretch the free part of the envelope away from the leading edge and away from the said underpart and thereby adopt at its forward part a curvature having a smaller radius of curvature than that of the leading edge of the airfoil while providing at its lower part along said underpart a substantially plane surface operating as a forward and downward displacement of said underpart.

2. In combination with an airfoil, means to modify the aerodynamic characteristics of the airfoil comprising means forming at least one expansible chamber along the leading edge thereof, means to supply fluid under pressure to said chamber to inflate the same, and a supple elastic cover operatively connected to the airfoil and to said chamber forming means and normally holding the chamber in collapsed position, said chamber forming means being located unsymmetrically with respect to the median plane of the airfoil, said chamber forming means comprising a deformable bag mounted on the leading edge of said airfoil and directly secured to the upper side of said airfoil close to the leading edge thereof, said cover comprising a sheet of elastic material fixed at the front edge thereof to said bag and to the airfoil and at the rear edge thereof to the underside of said airfoil relatively remote from the leading edge thereof.

3. In combination with an airfoil, means to modify the aerodynamic characteristics of the airfoil comprising means forming at least one expansible chamber along the leading edge thereof, means to supply fluid under pressure to said chamber to inflate the same, and a supple elastic cover operatively connected to the airfoil and to said chamber forming means and normally holding the chamber in collapsed position, said chamber forming means being located unsymmetrically with respect to the median plane of the airfoil, said chamber forming means comprising a bag of rubber mounted on the leading edge of said airfoil and directly secured to the upper side of the airfoil close to the leading edge thereof, said cover comprising a sheet of elastic material fixed at the front edge thereof to an intermediate line of said bag and at the rear edge thereof to the under side of said airfoil at a point relatively remote from the leading edge thereof.

4. In combination with an airfoil, means to modify the aerodynamic characteristics of the airfoil comprising means forming at least one expansible chamber along the leading edge thereof, means to supply fluid under pressure to said chamber to inflate the same, and a supple elastic cover operatively connected to the airfoil and to said chamber forming means and normally holding the chamber in collapsed position, said chamber forming means being located unsymmetrically with respect to the median plane of the airfoil, said chamber means comprising a deformable bag mounted on the leading edge of the airfoil, said cover comprising an envelope enclosing said bag and fixed at its front edge to the upper side of the airfoil close to the leading edge thereof, the rear edge of said envelope being arranged flush with the underside of the airfoil at a substantial distance from the leading edge of the airfoil, and rearwardly acting elastic means secured to the rear edge of the envelope and normally tensioning the envelope in the rearward direction.

LOUIS ARSANDAUX.